United States Patent [19]

Miedaner et al.

[11] 4,349,637

[45] Sep. 14, 1982

[54] ALUMINA BINDER FOR FIBER CONTAINING ALUMINA

[75] Inventors: Patrick M. Miedaner, Blue Bell, Pa.; Chhattar S. Kucheria, Grand Island, N.Y.

[73] Assignee: Kennecott Corporation, Stamford, Conn.

[21] Appl. No.: 142,271

[22] Filed: Apr. 21, 1980

[51] Int. Cl.$^3$ ............................................. C04B 35/10
[52] U.S. Cl. .................................................... 501/126
[58] Field of Search ................ 106/65, 85; 423/561 R

[56] References Cited

U.S. PATENT DOCUMENTS

| | | | |
|---|---|---|---|
| 2,818,345 | 12/1957 | Vickers et al. | 106/57 |
| 3,274,008 | 9/1966 | Braunwarth et al. | 106/65 |
| 3,615,778 | 10/1971 | Albert | 106/65 |
| 3,775,141 | 11/1973 | Weidman | 106/65 |
| 3,785,838 | 1/1974 | Weidman | 106/65 |
| 3,975,202 | 8/1976 | Emblem et al. | 106/65 |
| 3,983,197 | 9/1976 | Mitsche et al. | 106/65 |

FOREIGN PATENT DOCUMENTS 1142201  2/1969  United Kingdom ................ 106/65

Primary Examiner—O. R. Vertiz
Assistant Examiner—Margaret B. Medley
Attorney, Agent, or Firm—Raymond W. Green; R. Lawrence Sahr

[57] ABSTRACT

A thickened binder composition which comprises from about 3 to about 20 weight percent colloidal alumina, from about 1 to about 8 weight percent aluminum chlorhydrate and from about 0.1 to about 0.4 weight percent of an inorganic acid selected from hydrochloric and nitric acids and from about 75 to about 95 weight percent water;

the method for manufacturing the binder composition and a fiber article by blending the ingredients of the binder composition with each other and by impregnating or blending fibers with the binder composition to form a fiber containing composition followed by drying and calcining the fiber composition; and an article comprising alumina-containing fibers bound together with alumina.

9 Claims, No Drawings

ALUMINA BINDER FOR FIBER CONTAINING ALUMINA

BACKGROUND OF THE INVENTION (A) Field of the Invention

This invention relates to refractory fiber articles and their method of manufacture and more particularly relates to refractory fiber articles comprising refractory fibers bound together with a refractory cement and to the method of manufacturing such articles. The invention further relates to the refractory cements and compositions utilized to bind the refractory fibers.

(B) History of the Prior Art

In the prior art is is known that certain refractory fibers can be held together with certain refractory cements. For example, it is known that alumino-silicate fibers can be bound together with compositions comprising a high percentage of colloidal silica. The use of colloidal silica, unfortunately, has had certain disadvantages in that the colloidal silica is costly and is not as temperature resistant as the alumina containing fibers which the colloidal silica binder holds together.

It was, nevertheless, felt necessary that colloidal silica be used in binder compositions to hold alumina containing fibers together. The use of the colloidal silica in conjunction with other additives was believed necessary in order to obtain an inorganic binder system which would not migrate during drying of the composition. It is stated, for example, in U.S. Pat. No. 3,775,141 issued Nov. 27, 1973 to Weidman that 10% to 200% by weight negatively charged colloidal silica impregnant is used and preferably 30% to 150% impregnant is used in conjunction with other additives to minimize migration of the colloids.

In the absence of colloidal silica plus aluminum chlorhydrate, or other aluminum salt, to prevent binder migration, flocculants or other compounds were believed necessary to cause the actual binding material in the binder composition to deposit upon the surface of the fibers. Such flocculants are described in the previously mentioned U.S. Pat. No. 3,775,141 and in U.S. Pat. No. 3,785,838 issued Jan. 15, 1974 to Weidman. Neither of these patents disclose a binder composition which will result in an entirely alumina based binder holding alumina or alumino-silicate fibers.

In the prior art it was known that refractory cements could be prepared which consisted essentially of alumina or alumina forming compounds. These cements were used, for example, in the construction of furnaces or for repairing furnaces or parts of furnaces as well as for embedding or cementing nozzles and the like shapes into metal housings to protect the housings from the effect of high temperature and erosion, or for use as a mortar in laying refractory bricks and for similar objects. Such compositions are described in U.S. Pats. Nos. 2,818,345 issued Dec. 31, 1957 to Vickers et al. and 3,274,008 issued Sept. 20, 1966 to Braunwarth et al. Neither of these patents describe any method for gelling or thickening an entirely alumina forming binder composition to prevent binder migration nor do either of the patents describe the binding of alumina or alumino-silicate fibers with a binder composition which will form an entirely alumina based binder.

BRIEF DESCRIPTION OF THE INVENTION

In accordance with the invention there is provided an article comprising fibers bound together with alumina wherein the fibers themselves comprise at least 40 weight percent and preferably at least 50 weight percent and even more preferably for very high temperature applications at least 90 weight percent alumina. The binder composition itself within the article comprises at least 95 weight percent alumina.

The binder composition from which the article is manufactured comprises alumina or alumina precursors which are converted to alumina during drying or calcining operations. The binder composition is a gelled or thickened composition which prevents binder migration during drying and calcining to form the article.

More specifically, the binder composition is a thickened liquid into which the fibers or any filler are dispersed to form a cement or molding composition, or with which the fibers and any filler are impregnated. As previously mentioned, the liquid composition is a gelled liquid which more specifically comprises from about 3 to about 20 weight percent colloidal alumina, from about 1 to about 8 weight percent aluminum chlorhydrate and from about 0.1 to about 0.4 weight percent of an inorganic acid selected from hydrochloric and nitric acids and from about 75 to about 95 weight percent water.

After the fibers are impregnated with the binder composition, the resulting fiber containing composition comprises from about 10 to about 35 weight percent fibers, from about 2 to about 18 percent colloidal alumina, from about 1 to about 7 weight percent of aluminum chlorhydrate, from about 0.1 to 0.4 weight percent of an inorganic acid selected from hydrochloric and nitric acids and from about 50 to about 85 weight percent water. From about 1 to 18% filler based upon the total weight of the composition may also be present.

Desirably, both the gelled liquid binder composition and the impregnated fiber composition additionally contains sulfate ion in an amount of from about 0.001 to about 0.01 weight percent.

The invention further comprises the method for manufacturing the binder composition and the fiber article by blending the ingredients of the binder composition with each other and by impregnated or blending fibers with the binder composition followed by drying and calcining the resulting product.

DETAILED DESCRIPTION OF THE INVENTION

The fibers from which the article is manufactured may be any refractory fiber but is preferably an alumina or an alumino-silicate fiber containing at least 40 weight percent and preferably at least 50 weight percent alumina and having a melting temperature of between about 1,850° C. and 2,050° C. The fibers usually have a diameter of from 1 to 4 microns and an average length in excess of about 10 microns and preferably in excess of 20 microns. Fibers having short average lengths, e.g. below 20 microns can be obtained by ball milling longer fibers.

A filler in an amount of from about 1 to 18% by weight of total fiber, filler, and binder composition may be present. The most preferred filler is particulate alumina, e.g. tabular alumina, but if maximum temperature resistance is not required, other fillers such as particulate silica, e.g. silica flour, may be used. The filler is usually incorporated into the finished article simultaneously with the incorporation of the fibers.

The binder composition utilized to impregnate or blend with the fibers and accompanying filler, if any, preferably contains no colloidal silica and no flocculants. Desirably greater than 95 weight percent of the solids in the composition comprise alumina or solids which upon calcining convert to alumina. Small percentages of silica may be present in any solids which do not form alumina upon calcining; however, the composition preferably contains less than 2 weight percent silica.

The binder composition may be combined with the fibers and accompanying filler, if any, by any suitable means such as blending the fibers and filler into the composition or by impregnating a preformed fiber mat with the composition. Usually, at least when the article is an insulation board, from about 60 to about 90 weight percent of binder composition is combined with from about 10 to about 40 weight percent of fibers.

As previously discussed, the composition is a gelled or thickened composition which results from the presence of aluminum chlorhydrate and inorganic acid selected from hydrochloric and nitric acids. Even better thickening is obtained when from about 0.001 to about 0.01 weight percent of sulfate ion is present. Gelled or thickened as used herein means having a viscosity in excess of 200 centipoises. The viscosity of the binder composition prior to combining it with the fibers is low enough to permit flow and is usually between 200 and 600 centipoises.

In the case where fibers are blended into the composition, a fiber article such as a mat is formed by pouring the composition blended with fibers into a mold from which excess liquid binder composition, if any, will drain.

In the case where a fiber mat is impregnated with the composition, any excess binder composition is also permitted to drain.

After draining, the resulting fiber mat or other article is dried at a temperature of from about 100° C. to about 350° C. for a sufficient time to remove essentially all water from the article.

The drying time is dependent upon the drying temperature, the thickness and porosity of the article and upon the water content of the binder composition. For a 1 inch thick fiber board containing about 85 weight percent water and a finished density of about 22 pounds per cubic foot, a drying temperature of about 260° C. for 12 hours has been found to be sufficient.

The colloidal alumina utilized in the binder composition has an average particle size which is less than 100 microns and preferably less than 50 microns. The colloidal alumina preferably comprises alpha alumina monohydrate (boehmite). The surface area in general is between about 100 and about 400 square meters per gram. The purity of the alumina is desirably very high with the exception of water which may be present in the colloidal alumina composition in a quantity of up to about 30 weight percent.

The aluminum chlorhydrate utilized in accordance with the invention generally has the formula:

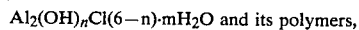

$Al_2(OH)_nCl(6-n) \cdot mH_2O$ and its polymers, where n is a number of less than 6 and m is a number less than 4. In general, the aluminum chlorhydrate is utilized in a 50% solution.

In practising the invention in accordance with one embodiment, fibers are slurried into water and the slurry is desirably thoroughly and rapidly mixed for from about 5 to about 30 minutes. This slurry is continuously agitated while it is pumped or drawn by a vacuum to a mold which may be submerged in the slurry. Water from the slurry is permitted to pass through a screen in the mold thus forming a fiber mat against the screen. The thickness of the mat is determined by the fiber concentration in the slurry and a quantity of liquid passing through the screen which in turn is determined by the length of time the mold remains submerged in the slurry. The mold is then removed from the slurry and excess liquid is removed from the mold by gravity draining, a vacuum, compressed air or any other suitable means. The damp mat is then removed from the mold by any suitable means such as picking up the mat with a suction device or rotating the mold 180° so that the mat falls from the mold by gravity. Compressed air may be applied through the mold screen to assist in loosening or removing the mat. After the mat is removed, it may be carried to a frame which permits a vacuum to be drawn through the mat. The mat may be carried by any holding and transporting means such as a holding tray or suction carrier attached to a chain or belt conveyor.

The mat is then impregnated, i.e., soaked, with the binder composition in accordance with the invention, which as previously discussed, comprises from about 3 to about 20 weight percent colloidal alumina, from about 1 to about 8 weight percent aluminum chlorhydrate, from about 0.1 to about 0.4 weight percent of an inorganic acid selected from the group consisting of hydrochloric and nitric acids and from about 75 to about 95 weight percent water. The composition may additionally contain small quantities, i.e., from about 0.001 to about 0.010 weight percent of sulfate ion which is commonly supplied with sulfuric acid and may also contain a very small percentage, i.e., less than about 0.01% of a defoamer such as a silicone emulsion. The composition as a dispersent may also contain a low percentage of clay such as bentonite, i.e., less than about 1%.

In a the preferred embodiment of the invention, the binder composition is manufactured by blending a colloidal alumina, filler, if any, hydrochloric or nitric acid and water together to form a first component and by blending the aluminum chlorhydrate, sulfuric acid, if any, and water to form a second component of the blend. The binder composition used to impregnate a fiber article or into which fibers are dispersed is then formed by mixing the first and second components of the blend in a suitable ratio to obtain the binder composition previously described which ratio is usually between about 7 and about 12 parts of the first component to one part of the second component of the blend.

More specifically the preferred process for manufacturing a thickened ceramic binder composition comprises blending together ingredients comprising from about 3 to about 22 weight percent of colloidal alumina, from about 0.1 to about 0.5 weight percent of an inorganic acid selected from the group consisting of hydrochloric and nitric acids and from about 96.9 to about 77.5 weight percent of water to form a first blend component; blending together ingredients comprising from about 9 to about 60 weight percent of aluminum chlorhydrate and from about 40 to about 91 weight percent water to form a second blend component; and blending together the first and second blend components at a ratio between 7:1 and 12:1 of first to second component to form a thickened binder composition as previously described.

After the boards are impregnated with the binder composition blend and the fiber mat or other fiber article is impregnated with the binder composition, the article is heated to remove excess water, e.g., to above 100° C. and preferably up to as high as 300° C. and the article may then be fired at temperatures of above 800° C. up to the melting or decomposition temperature of the article in an oxygen containing atmosphere to convert the aluminum chlorhydrate to aluminum oxide. The maximum temperature to which the article is heated to convert the aluminum chlorhydrate to aluminum oxide (calcine the article) is usually below 1,650° C.; but in the case of an article containing very low impurities and consisting of almost entirely alumina or components which will convert to alumina at high temperatures in an oxygen containing atmosphere, may be even higher.

Alternatively, the article may be used without calcining simply by incorporating the article into a high temperature environment wherein the calcining will take place in situ.

The following examples serve to illustrate and not limit the invention. Unless otherwise indicated, all parts and percentages are by weight.

EXAMPLE 1

688 pounds of water are introduced into a 250 gallon tank and 110 pounds of colloidal alumina powder is added which consists essentially of about 90 weight percent colloidal alumina having an average particle size of less than about 25 microns with about 12 weight percent of the colloidal alumina having a particle size larger than 90 microns and wherein the surface area of the colloidal alumina is about 175 square meters per gram. The tank is agitated with dual agitators to completely disperse the colloidal alumina into the water. A solution containing 8.8 pounds of 37% of hydrochloric acid is mixed into 50 pounds of water and the resulting solution is added to the rapidly stirred colloidal alumina suspension. The suspension is then allowed to stir for an additional 15 to 20 minutes. The suspension is then further diluted with about 940 pounds of water to the required volume of 210 gallons and stirring is again continued for ten minutes.

A second solution is prepared by mixing 600 pounds of aluminum chlorhydrate (chlorhydrol), 50% solution with 12 pounds of 97% sulfuric acid and 12 pounds of water.

50 pounds of the first suspension is mixed with 5.5 pounds of the second solution to form the binder composition. 50 pounds of the binder composition is used to impregnate a 1 inch by 24 inch by 48 inch mat or board formed as previously described by slurrying fibers into water and drawing the slurry through a mold and removing excess water by means of a vacuum. The resulting impregnated board is then dried at about 260° C. for 12 hours. The inner temperature of the boards was held at about 250° C. for 4 hours. After drying, the board is visually inspected. The cross section of the board appears to be uniform and no migration or delamination problem is observed. Physical measurements of bulk density, hardness, initial modulus of rupture, modulus of rupture after firing at 1000° C. and chlorine contents are conducted on the board. The density is found to be about 22 pounds per cubic foot. The hardness is found by durameter reading to be an average of about 31, the initial modulus of rupture is found to be an average of about 100 to 131 psi. and the modulus of rupture after being fired at 1000° C. is found to be about 58 pounds per square inch. The shrinkage of the board after 24 hours at 1260° C. is found to be about 3.5% in each direction along the length and width and thickness.

The characteristics of the finished board are found to be comparable to the characteristics of a standard alumina-silicate fiber board prepared using silica in the binder except that due to the pure alumina binder system, the temperature resistance of the board containing essentially pure alumina binder is somewhat higher than the temperature resistance of the board using colloidal silica in the binder system.

EXAMPLE 2

Example 1 is repeated except that the solids content of the colloidal alumina dispersion is reduced so that the dispersion contains 5% rather than 5.5% of colloidal alumina and the weight ratio of chlorhydrol to alumina in the finished binder composition is 0.497 chlorhydrol to 1 part alumina instead of 1.7 parts chlorhydrol to about 1 part alumina in Example 1. The resulting board is found to have specifications comparable to those of the board prepared in accordance with Example 1 except that the modulus of rupture after firing is somewhat higher at about 66 psi. The density is found to be an average of about 22.3 pounds per cubic foot and the hardness is found to be between 25 and 28. The modulus of rupture before firing is between 111 and 119. The board has uniformly appearing density through its cross section which shows the absence of undesireable binder migrations.

EXAMPLE 3

Example 1 is essentially repeated except that the initial dispersion contains about 7.5 weight percent of colloidal alumina and the ratio of chlorhydrol to alumina is 0.312 chlorhydrol to 1 part alumina. The resulting board again has characteristics similar to those of the board obtained in Example 1. The density is about 23.7. The hardness is about 40. The initial modulus of rupture is between 145 and 159 psi. The modulus of rupture after firing is about 76 psi, substantially higher than Example 1.

EXAMPLE 4

Example 1 is again essentially repeated except that a suspension containing 6% colloidal alumina is used and the weight ratio of chlorhydrol to alumina in the binder composition is about 0.63 chlorhydrol to 1 part alumina. The density is about 22.9 pounds per cubic foot and the hardness is between 33 and 40. The initial modulus of rupture is between 139 and 142 psi. The modulus of rupture after being fired at 1000° C. for 24 hours is about 71 psi. The board has a uniform cross section.

The foregoing examples clearly illustrate that an excellent alumina containing fiber article bound together with alumina can be prepared without using any significant quantity of silica and without using flocculants, both of which can decrease maximum heat resistance.

What is claimed is:

1. A thickened binder composition comprising from about 3 to about 20 weight percent colloidal alumina, from about 1 to about 8 weight percent aluminum chlorhydrate, from about 0.1 to about 0.4 weight percent of an inorganic acid selected from the group consisting of hydrochloric and nitric acids and from about 75 to about 95 weight percent water, at least 95 weight percent of the solids in said composition being alumina or solids which convert to alumina upon calcining.

2. The composition of claim 1 wherein the composition additionally contains from about 0.001 to about 0.010 weight percent of sulfate ion.

3. The composition of claim 2 wherein the sulfate ion is provided by sulfuric acid.

4. A thickened composition comprising from about 10 to about 35 weight percent fibers which comprise alumina, and the balance being the binder composition of claim 1.

5. The liquid composition of claim 4 which additionally contains from about 0.001 to about 0.010 weight percent of sulfate ion.

6. A process for manufacturing a thickened ceramic binder composition which comprises:
 (a) blending together ingredients comprising from about 3 to about 22 weight percent of colloidal alumina, from about 0.1 to about 0.5 weight percent of an inorganic acid selected from the group consisting of hydrochloric and nitric acids and from about 96.9 to about 77.5 weight percent of water to form a first blend component;
 (b) blending together ingredients comprising from about 9 to about 60 weight percent of aluminum chlorhydrate and from about 40 to about 91 weight percent water to form a second blend component; and
 (c) blending together the first and second blend components at a ratio between 7:1 and 12:1 of first to second component to form a thickened binder composition comprising: from about 3 to about 20 weight percent colloidal alumina, from about 1 to about 8 weight percent aluminum chlorhydrate, from about 0.1 to about 0.4 weight percent of an inorganic acid selected from the group consisting of hydrochloric and nitric acids and from about 75 to about 95 weight percent water, at least 95 weight percent of the solids in said composition being alumina or solids which convert to alumina upon calcining.

7. The process of claim 6 wherein the second blend component also contains from about 0.01 to about 0.12 weight percent of sulfate ion.

8. The process of claim 6 wherein from about 60 to about 90 weight percent of the resulting binder composition is combined with from about 10 to about 40 weight percent of fibers comprising at least 40 weight percent alumina, the resulting fiber containing composition is dried at between about 100° and 350° and calcined at from about 800 to about 1650° C. in an oxygen containing atmosphere to form an article comprising alumina-containing fibers held together with an alumina binder.

9. The process of claim 8 wherein the binder composition is combined with from about 1 to about 18 weight percent of particulate alumina filler simultaneously with its combination with the fibers.

* * * * *